UNITED STATES PATENT OFFICE.

HEINRICH BRUNCK, OF LUDWIGSHAFEN-ON-THE-RHINE, BAVARIA, ASSIGNOR TO THE BADISCHE ANILIN AND SODA FABRIK, OF MANNHEIM, GERMANY.

MANUFACTURE OF ANTHRACENE-BLUE.

SPECIFICATION forming part of Letters Patent No. 258,530, dated May 23, 1882.

Application filed November 2, 1881. (Specimens.)

*To all whom it may concern:*

Be it known that I, HEINRICH BRUNCK, a subject of the King of Bavaria, residing at Ludwigshafen-on-the-Rhine, in the Kingdom of Bavaria and Empire of Germany, have invented new and useful Improvements in Dye-Stuffs or Coloring-Matters, of which the following is a specification.

My invention relates to the manufacture of a new blue coloring-matter, easily soluble in water, from artificial alizarine, which I term "anthracene-blue."

In carrying out my invention I take artificial alizarine from which the yellowish-red dyeing coloring-matters have been separated and convert the same into alizarine-orange by the action of nitrous hyponitric or nitric acids, substantially in the manner described in Letters Patent granted to Heinrich Caro, January 9, 1877, No. 186,032. I then take one part of this alizarine-orange in paste containing about fifteen per cent. dry coloring-matter, one part of glycerine of 28° Baumé, and five parts of sulphuric acid, 66° Baumé, and after having mixed these materials I heat the mixture slowly to about 100° centigrade. During the reaction the mass assumes a dark color, and after a short time, when no more nitroalizarine can be traced in the mass, the reaction is terminated by the addition of cold water. The temperature must not be permitted to rise above 110° centigrade, since by a too vigorous reaction the product already formed is destroyed. After the reaction has been terminated in the manner above stated the mass is left to cool, and it is then placed on a filter and washed with cold water. The mother-liquor contains surplus acid, glycerine, and easily-soluble products of the reaction. The product remaining on the filter is purified by boiling the same in very dilute sulphuric acid (two and one-half per cent.) and filtering while boiling. The purified product which is in solution separates after the filtrate has been cooled in beautiful red crystals, which, on being washed with water, assume a blue color. Of this substance I take a quantity representing about twelve pounds of dry crystals and add thereto from twenty-five to thirty pounds of a solution of bisulphite of soda of 1.25 specific gravity. This mixture is left untouched in closed vessels for about eight to fourteen days, during which time a portion is dissolved, and the solution thus obtained is filtered off from the undissolved part. From this solution my new anthracene-blue is obtained, either by precipitation—for instance, with common salt—or by a careful evaporation at a temperature not exceeding 50° centigrade. The undissolved portion may be subjected to the same treatment.

The anthracene-blue obtained in the manner described is in the form of a crystalline mass. It is easily soluble in water, with a reddish-brown color, and has, when dissolved, the property of being decomposed, either when heated over 70° centigrade or at an ordinary temperature, by strong acids, or by alkalies and their carbonates, with the reproduction of the substance hereinbefore described as forming red crystals which become blue after washing with water. It is, however, not decomposed when to an aqueous solution acetic acid, tartaric acid, or the lime salts, the magnesia salts, and the chromic salts of these organic acids are added. This valuable property of the anthracene-blue enables me to develop the color in or upon a textile fiber in the manner described in the specification pertaining to another application for a patent.

What I claim as new, and desire to secure by Letters Patent, is—

As a new article of manufacture, the blue coloring-matter termed "anthracene-blue," having the characteristics hereinbefore stated.

In testimony whereof I have hereunto set my hand in the presence of two subscribing witnesses.

HEINRICH BRUNCK.

Witnesses:
CARL GLASER,
AUGUST HANSEL.